(12) United States Patent
Jung

(10) Patent No.: US 10,936,198 B2
(45) Date of Patent: Mar. 2, 2021

(54) RESISTANCE SWITCHING MEMORY-BASED COPROCESSOR AND COMPUTING DEVICE INCLUDING THE SAME

(71) Applicants: MemRay Corporation, Seoul (KR); YONSEI UNIVERSITY, UNIVERSITY—INDUSTRY FOUNDATION (UIF), Seoul (KR)

(72) Inventor: Myoungsoo Jung, Incheon (KR)

(73) Assignees: MemRay Corporation, Seoul (KR); Yonsei University, University—Industry Foundation (UIF), Seoul (KR)

( * ) Notice: Subject to any disclaimer, the term of this patent is extended or adjusted under 35 U.S.C. 154(b) by 404 days.

(21) Appl. No.: 15/344,734

(22) Filed: Nov. 7, 2016

(65) Prior Publication Data

US 2018/0032251 A1    Feb. 1, 2018

Related U.S. Application Data

(60) Provisional application No. 62/366,667, filed on Jul. 26, 2016.

(30) Foreign Application Priority Data

Sep. 19, 2016   (KR) .................. 10-2016-0119517

(51) Int. Cl.
*G06F 12/00* (2006.01)
*G06F 3/06* (2006.01)
(Continued)

(52) U.S. Cl.
CPC ............ *G06F 3/061* (2013.01); *G06F 3/0647* (2013.01); *G06F 3/0659* (2013.01);
(Continued)

(58) Field of Classification Search
CPC .... G06F 3/0659; G06F 3/0604; G06F 3/0679; G06F 3/0652; G06F 3/0656; G06F 3/061;
(Continued)

(56) References Cited

U.S. PATENT DOCUMENTS 4,757,474 A * 7/1988 Fukushi ............... G11C 29/806
                                                      365/189.07
6,782,445 B1   8/2004 Olgiati et al.
(Continued)

FOREIGN PATENT DOCUMENTS

JP    2003-502728    1/2003
KR    10-2007-0027755    3/2007
(Continued)

OTHER PUBLICATIONS

J. Albericio et al., "Cnvlutin: Ineffectual-neuron-free deep convolutional neural network computing" in ISCA, Jun. 18, 2016.
(Continued)

*Primary Examiner* — Kalpit Parikh
(74) *Attorney, Agent, or Firm* — Dinsmore & Shohl LLP

(57) ABSTRACT

In a coprocessor performing data processing by supplementing functions of a CPU of a host or independently of the CPU, a processing element corresponding to a core of the coprocessor executes a kernel transferred from the host, and a server manages a memory request generated according to an execution of the kernel by the processing element. A memory controller connected to the resistance switching memory module moves data corresponding to the memory request between the resistance switching memory module and the processing element in accordance with the memory request transferred from the server. A network integrates the processing element, the server, and the memory controller.

21 Claims, 15 Drawing Sheets

(51) Int. Cl.
*G06F 13/16* (2006.01)
*G06F 12/0804* (2016.01)
*G06F 12/0897* (2016.01)

(52) U.S. Cl.
CPC ........ *G06F 3/0679* (2013.01); *G06F 12/0804* (2013.01); *G06F 12/0897* (2013.01); *G06F 13/16* (2013.01); *G06F 13/1663* (2013.01); *G06F 2212/1016* (2013.01)

(58) Field of Classification Search
CPC ............... G06F 3/0647; G06F 9/30043; G06F 13/1668; G06F 13/16; G06F 13/1663; G06F 12/0804; G06F 12/897; G06F 2212/1016
See application file for complete search history.

(56) References Cited

U.S. PATENT DOCUMENTS

| | | |
|---|---|---|
| 2002/0144066 A1 | 10/2002 | Talreja et al. |
| 2006/0004951 A1 | 1/2006 | Rudelic et al. |
| 2008/0147968 A1 | 6/2008 | Lee et al. |
| 2009/0077346 A1 | 3/2009 | Steiner et al. |
| 2011/0063903 A1 | 3/2011 | Kang et al. |
| 2011/0173155 A1 | 7/2011 | Becchi et al. |
| 2012/0124317 A1 | 5/2012 | Mirichigni et al. |
| 2014/0129753 A1 | 5/2014 | Schuette et al. |
| 2014/0240327 A1* | 8/2014 | Lustig ............... G06T 1/20 345/505 |
| 2014/0281182 A1* | 9/2014 | Mirichigni ......... G06F 13/1689 711/104 |
| 2015/0039712 A1* | 2/2015 | Frank ................ H04L 67/40 709/212 |
| 2015/0089105 A1* | 3/2015 | Lu .................... G06F 9/442 710/269 |
| 2016/0012890 A1 | 1/2016 | Park et al. |
| 2017/0060588 A1 | 3/2017 | Choi |
| 2017/0199835 A1 | 7/2017 | Kim et al. |
| 2018/0040372 A1 | 2/2018 | Kang |

FOREIGN PATENT DOCUMENTS

| | | |
|---|---|---|
| KR | 10-2010-0076657 | 7/2010 |
| KR | 10-2011-0029402 | 3/2011 |
| KR | 10-2016-0006034 | 1/2016 |
| KR | 10-2017-0027125 | 3/2017 |
| KR | 10-2017-0064259 | 6/2017 |
| KR | 10-2017-0084969 | 7/2017 |

OTHER PUBLICATIONS

Y. C. Bae et al., "A 1.2v 30nm 1.6gb/s/pin 4gb lpddr3 sdram with input skew calibration and enhanced control scheme" in ISSCC, Feb. 20, 2012.

Y.H.Chen et al., "Eyeriss: A spatial architecture for energy-efficient dataflow for convolutional neural networks" in ISCA, Jun. 2016.

P. Chi et al., "A novel processing-in-memory architecture for neural network computation in reram-based main memory" in ISCA, Jun. 2016.

B. Gu et al., "Biscuit: A framework for near-data processing of big data workloads" in ISCA, Jun. 2016.

JESD209-2B(Revision of JESD209-2A, Oct. 2009), "Jedec standard: Low power double data rate 2 (lpddr2)", JEDEC Solid State Technology Association, Feb. 2010.

M. J. Kang et al., "Pram cell technology and characterization in 20nm node size" IEDM, Dec. 2011.

S. Kang et al., "A 0.1 um 1.8-v 256-mb phase-change random access memory (pram) with 66-mhz synchronous burst-read operation" IEEE Journal of Solid-State Circuits, vol. 42, No. 1, Jan. 2007.

D. Kim et al., "Neurocube: A programmable digital neuromorphic architecture with high-density 3d memory", ISCA, Jun. 2016.

V. V. Kindratenko et al., "Gpu clusters for high-performance computing", IEEE International Conference on Cluster Computing and Workshops, Aug. 31, 2009.

J. Kruger and R. Westermann, Linear algebra operators for gpu implementation of numerical algorithms, ACM Trans. Graph, vol. 22 Issue 3, Jul. 2003, pp. 908-916.

Homepage of Louis-Noël Pouchet, "PolyBench/C—the polyhedral benchmark suite", URL: http://www.cs.ucla.edu/~pouchet/software/polybench/, Mar. 2012.

M. K. Qureshi et al., "Preset: Improving performance of phase change memories by exploiting asymmetry in write times", ISCA, Jun. 2016.

Texas-Instruments, "TMS320C6678 Multicore fixed and floating-point digital signal processor", Nov. 2010; Revised Mar. 2014.

H.-W. Tseng et al., "Morpheus: creating application objects efficiently for heterogeneous computing", ISCA, Jun. 2016.

Y. Xie., "Modeling, architecture, and applications for emerging memory technologies", IEEE Design Test of Computers, Feb. 4, 2011.

Product Specification, "Spartan-6 family overview", Xilinx, Inc., DS160 (v2.0), Oct. 25, 2011.

J. Zhang et al., "Nvmmu: A non-volatile memory management unit for heterogeneous gpu-ssd architectures", International Conference on Parallel Architecture and Compilation(PACT), Oct. 2015.

Stam, Maximizing GPU Efficiency in Extreme Throughput Applications, GPU Technology Conference (Year: 2009).

\* cited by examiner

FIG. 14 kernel Loading
```
pushData(kernel, &boot_addr);
writeMemory(MAGIC_ADDR, &boot_addr)
```

Data downloading
```
saveOutputFile(FPGA_ADDR, memBuffer)
```

RESISTANCE SWITCHING MEMORY-BASED COPROCESSOR AND COMPUTING DEVICE INCLUDING THE SAME

CROSS-REFERENCE TO RELATED APPLICATION

This application claims priority to and the benefit of U.S. Provisional Application No. 62/366,667 filed on Jul. 26, 2016 in the U.S. Patent and Trademark Office and priority to and the benefit of Korean Patent Application No. 10-2016-0119517 filed on Sep. 19, 2016 in the Korean Intellectual Property Office, the entire contents of which are incorporated herein by reference.

BACKGROUND

(a) Field

The described technology generally relates to a resistance switching memory-based coprocessor and a computing device including the same.

(b) Description of the Related Art

Manycore-based coprocessors such as graphic processing units (GPUs) and many integrated core (MIC) devices with high computation parallelism and comparatively low power consumption are becoming increasingly popular. In such the coprocessors, many processing cores share execution control and can perform identical operations on numerous pieces of data via thread-level parallelism and data-level parallelism. A system using the coprocessor together with a central processing unit (CPU) can exhibit significant speed-ups compared to a CPU-only system.

The coprocessors can process more data than they have ever had before, and the volume of such data is expected. However, the coprocessors employ on-board memory whose size is relatively smaller compared to a host memory. The coprocessors therefore use a non-volatile memory, for example a solid state disk (SSD), connected to a host machine to process large sets of data.

However, the coprocessor and the non-volatile memory are completely disconnected from each other and are managed by different software stacks. Consequently, many redundant memory allocations/releases and data copies exist between a user-space and a kernel-space in order to read data from the non-volatile memory or write data to the non-volatile memory. Further, since a kernel module cannot directly access the user-space memory, memory management and data copy overheads between the kernel-space and the user-space are unavoidable. Furthermore, kernel-mode and user-mode switching overheads along with the data copies also contribute to long latency of data movements. These overheads causes the speedup improvement to be not significant compared to the coprocessor performance.

SUMMARY

An embodiment of the present invention provides a resistance switching memory-based coprocessor and a computing device including the same for removing unnecessary data movements/copies among a CPU, a storage device, and a coprocessor.

According to an embodiment of the present invention, a coprocessor performing data processing by supplementing functions of a CPU of a host or independently of the CPU is provided. The coprocessor includes a processing element, a server, a resistance switching memory module, a memory controller, and a network. The processing element corresponds to a core of the coprocessor and executes a kernel transferred from the host. The server manages a memory request generated according to an execution of the kernel by the processing element. The memory controller is connected to the resistance switching memory module and makes the processing element access the resistance switching memory module, thereby moving data corresponding to the memory request between the resistance switching memory module and the processing element in accordance with the memory request transferred from the server, without an assistance of an operating system of a computing device. The network integrates the processing element, the server, and the memory controller.

In one embodiment, the data may be not stored in the host while the data are moved between the resistance switching memory module and the processing element.

In one embodiment, the server stores a memory address of the kernel stored in the resistance switching memory module to the processing element, for the execution of the kernel.

In one embodiment, the server may store the memory address of the kernel to a cache of the processing element as a boot address.

In one embodiment, the coprocessor may further include a power sleep controller that controls a sleep mode of the processing element in accordance with a control of the server, and the server may put the processing element in the sleep mode using the power sleep controller before storing the memory address of the kernel to the processing element and revoke the processing element using the power sleep controller after storing the memory address of the kernel to the processing element.

In one embodiment, the coprocessor may further include an interface module that is used for a communication with the host. In this case, after the server receives an interrupt from the host through the interface module, the memory controller may store the kernel from the host to the resistance switching memory module.

In one embodiment, the processing element may include a cache. In this case, the processing element may issue the memory request to the server when a cache miss occurs in the cache of the processing element, and the memory controller may read data corresponding to the memory request from the resistance switching memory module and store the data to the cache of the processing element, without an assistance of other memories of the computing device.

In one embodiment, the processing element may include a cache. In this case, when the memory request includes a memory request for requesting to write data, and the memory controller may load data corresponding to the memory request from the cache of the processing element and write the data to the resistance switching memory module, without an assistance of other memories of the computing device.

In one embodiment, the resistance switching memory module may employ a DDR (double data rate) interface.

In one embodiment, the DDR interface may be a non-volatile memory interface.

In one embodiment, the resistance switching memory module may include a memory cell array including a plurality of resistance switching memory cells, a plurality of row address buffers, and a row decoder that selects a target row from the memory cell array. The memory controller may divide a row address for accessing the resistance switching memory module in accordance with the memory request into an upper address and a lower address, deliver the upper address to a target row address buffer among the plurality of row address buffers, and deliver the lower address to the row decoder. The row decoder may select the target row based on an address into which the upper address stored in the target row address buffer and the lower address received from the memory controller are combined.

In one embodiment, the memory controller may transfer an address for selecting the target row address buffer from among the plurality of row address buffers to the plurality of row address buffers.

In one embodiment, the resistance switching memory module may further include a plurality of row data buffers. In this case, data that are read from the target row of the memory cell array may be stored to a target row data buffer among the plurality of row data buffers.

In one embodiment, the resistance switching memory module may further include a register mapped to the memory cell array and a program buffer that stores data to be written to the memory cell array based on a value of the register. In this case, the data stored in the program buffer may be written to the memory cell array.

In one embodiment, the resistance switching memory module may include a phase-change memory module, a resistive memory module, or a magnetoresistive memory module.

A coprocessor according to another embodiment includes an interface module, a resistance switching memory module, a processing element, a server, a memory controller, and a network. The interface module is used for a communication with the host, and the resistance switching memory module stores a kernel transferred from the host. The processing element corresponds to a core of the coprocessor and loads the kernel from the resistance switching memory module to execute the kernel. The server communicates with the host and receives from the processing element a memory request generated according to an execution of the kernel. The memory controller is connected to the resistance switching memory module and makes the processing element access the resistance switching memory module in response to receiving the memory request from the host. The network integrates the interface module, the processing element, the server, and the memory controller.

In one embodiment, the memory controller may access the resistance switching memory module in accordance with the memory request to move data between the resistance switching memory module and the processing element without an assistance of an operating system and other memories of a computing device.

In one embodiment, the data may be not stored in the host while the data are moved.

In one embodiment, the server may store a memory address of the kernel stored in the resistance switching memory module to the processing element, and the processing element may load the kernel based on the memory address.

In one embodiment, the server may put the processing element in a sleep mode before storing the memory address of the kernel to the processing element, and revoke the processing element after storing the memory address of the kernel to the processing element.

According to yet another embodiment of the present invention, a computing device including a coprocessor according to above embodiment, a CPU, a system memory, and a memory bridge that connects the coprocessor and the system memory with the CPU is provided.

According to still embodiment of the present invention, overheads due to data copies/movements can be reduced by forming coprocessor by integrating a plurality of processing elements and a resistance switching memory module.

BRIEF DESCRIPTION OF THE DRAWINGS

FIG. 14 shows a programming model on a PRAM-based coprocessor according to an embodiment of the present invention.

DETAILED DESCRIPTION OF THE EMBODIMENTS

Figure 1:
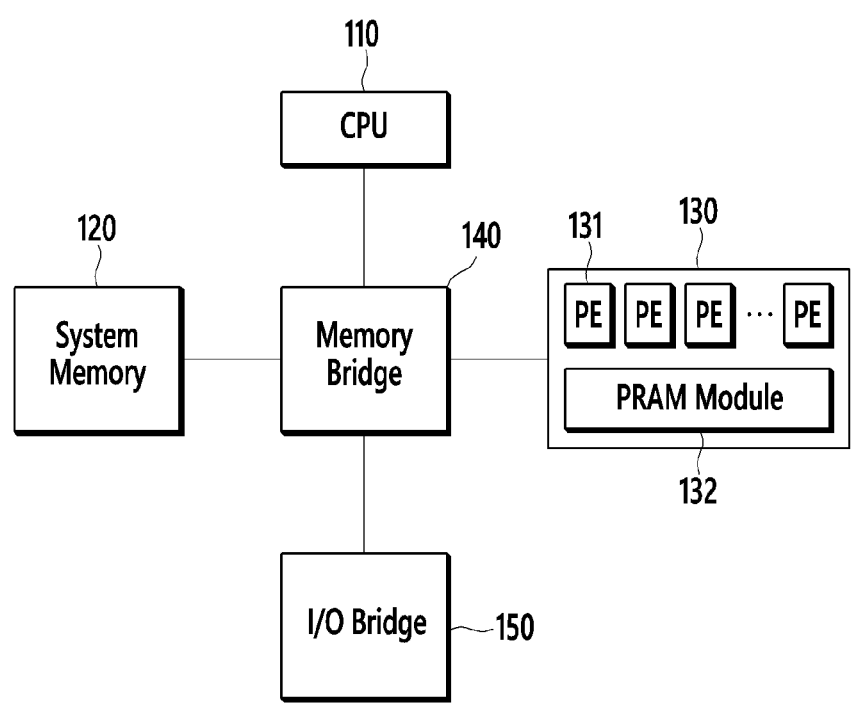
FIG. 1 is a schematic block diagram of a computing device according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a schematic block diagram of a computing device according to an embodiment of the present invention. FIG. 1 shows an example of the computing device, and the computing device according to an embodiment of the present invention may be implemented by use of various structures.

Referring to FIG. 1, a computing device includes a CPU 110, a system memory 120, and a resistance switching memory-based coprocessor 130.

Resistance switching memories include, as a non-volatile memory, a phase-change memory (PCM) using a resistivity of a resistance medium (phase-change material), a resistive memory using a resistance of a memory device, or a magnetoresistive memory. While the PCM, in particular, a phase-change random access memory (PRAM) is described as an example of the resistance switching memory in below embodiments, embodiments of the present invention are not limited to the PCM (or PRAM), but may be applicable to the resistive memory, for example, a resistive random access memory (RRAM) or the magnetoresistive memory, for example, a magnetoresistive random access memory (MRAM) such as a spin-transfer torque MRAM (STT-MRAM).

The system memory 120 is a main memory of the computing device and may be, for example, a dynamic random access memory (DRAM). A coprocessor used in the PRAM-based coprocessor 130 is a supplementary data processing device different from a general-purpose CPU, and may be computer hardware for performing data processing by supplementing functions of the CPU or performing the data processing independently of the CPU. A graphic processing unit (GPU) or many integrated core (MIC) device may be an example of this coprocessor.

In some embodiments, the computing device may further include a memory bridge 140 for connecting the system memory 120 and the PRAM-based coprocessor 300 with the CPU 110. The PRAM-based coprocessor 130 may be connected to the memory bridge 140 that locates at the CPU-side. For example, the PRAM-based coprocessor 130 may be connected to the memory bridge 140 via a PCIe (peripheral component interconnect express) interface. The memory bridge 140 may be, for example, a northbridge or a memory controller hub (MCH).

Further, the memory bridge 140 may be connected to an input/output (I/O) bridge 150. The I/O bridge 150 may be, for example, a southbridge or an I/O controller hub (ICH). The I/O bridge 150 may receive a user input from a user input device (not shown) and transfer the user input to the CPU 110 via the memory bridge 140.

While a conventional coprocessor includes only a plurality of processing elements for parallelism, the PRAM-based coprocessor 130 according to an embodiment of the present invention is a coprocessor, which physically integrates a plurality of processing elements 131 corresponding to coprocessor cores with a resistance switching memory module 132. As described above, the resistance switching memory module 132 is assumed as a PRAM module 132. As such, operations of the coprocessor 130 can be performed without exchanging data with a storage device by integrating the coprocessor 130 with the PRAM module 132 which is the non-volatile memory.

In some embodiments, a system including the CPU 110, the system memory 120, the memory bridge 140, and the I/O bridge 150 may be called a host.

The computing device may offload a kernel to the PRAM-based coprocessor 130, which allows the PRAM-based coprocessor 130 to directly execute the kernel. The kernel means any kind of function or program that can be executed on the coprocessors 130. For example, these applications may be applications that offload computations from the host to the PRAM-based coprocessor 130. These applications may be called kernels. Accordingly, the host may access the PRAM-based coprocessor 130 to either offload the kernel or handle read/write of data. In this case, the processing elements of the PRAM-based coprocessor 130 can directly access the PRAM module 132 of the PRAM-based coprocessor 130 with executing the kernel. Therefore, many redundant memory allocations/releases and data copies that are required to read data from an external memory or write data to the external memory by the conventional coprocessor can be removed.

Next, an example of the PRAM module 132 included in the PRAM-based coprocessor 130 according to an embodiment of the present invention is described.

Figure 2:
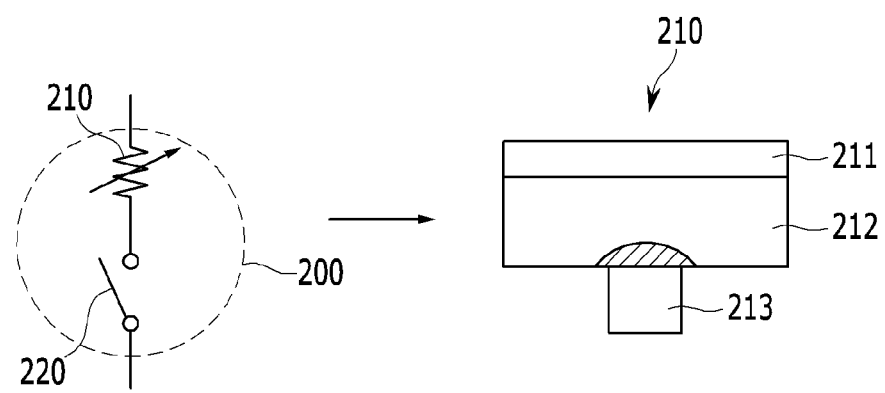
FIG. 2 schematically shows one memory cell in a PRAM.
Figure 3:
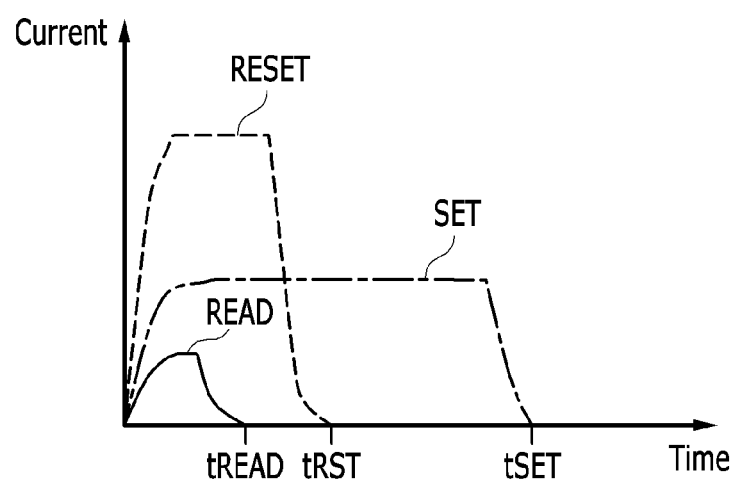
FIG. 3 shows a current applied to a memory cell shown in FIG. 2.
Figure 4:
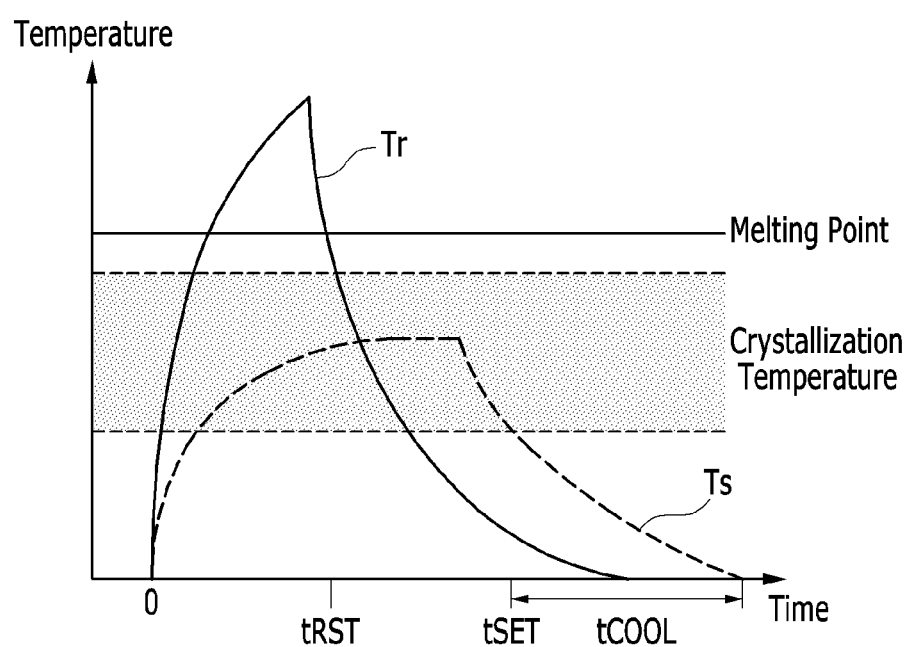
FIG. 4 shows a temperature change when a current shown in FIG. 3 is applied to a memory cell shown in FIG. 2.

FIG. 2 schematically shows one memory cell in a PRAM, FIG. 3 shows a current applied to a memory cell shown in FIG. 2, and FIG. 4 shows a temperature change when a current shown in FIG. 3 is applied to a memory cell shown in FIG. 2.

The memory cell shown in FIG. 2 is an example memory cell, and a memory cell of the PRAM according to embodiments of the present invention may be implemented in various forms.

Referring to FIG. 2, a memory cell 200 of a PRAM includes a phase change element 210 and a switching element 220. The switching element 220 may be implemented with various elements such as a transistor or a diode. The phase change element 210 includes a phase change layer 211, an upper electrode 212 formed above the phase change layer 211, and a lower electrode 213 formed below the phase change layer 211. For example, the phase change layer 210 may include an alloy of germanium (Ge), antimony (Sb) and tellurium (Te), which is referred to commonly as a GST alloy, as a phase change material.

The phase change material can be switched between an amorphous state with relatively high resistivity and a crystalline state with relatively low resistivity. A state of the phase change material may be determined by a heating temperature and a heating time.

Referring to FIG. 2 again, when a current is applied to the memory cell 200, the applied current flows through the lower electrode 213. When the current is applied to the memory cell 200 during a short time, a portion, of the phase change layer 211, adjacent to the lower electrode 213 is heated by the current. The cross-hatched portion of the phase change layer 211 is switched to one of the crystalline state and the amorphous state in accordance with the heating profile of the current. The crystalline state is called a set state and the amorphous state is called a reset state.

Referring to FIG. 3 and FIG. 4, the phase change layer 211 is programmed to the reset state when a reset pulse RESET with a high current is applied to the memory cell 200 during a short time tRST. If a temperature Tr of the phase change material reaches a melting point as the phase change material of the phase change layer 211 is heated by the applied reset pulse RESET, the phase change material is melted and then is switched to the amorphous state. The phase change layer 211 is programmed to the set state when a set pulse SET having a lower current than the reset pulse RESET is applied to the memory cell 200 during a time tSET being longer than the time tRST. If a temperature Ts of the phase change material reaches a crystallization temperature lower than the melting point as the phase change material is heated by the applied set current SET, the phase change material is transformed to the crystalline state. Since the reset state and the set state can be maintained when a pulse is applied with a lower current than the set pulse SET or with being shorter than the set pulse SET, data can be programmed to the memory cell 200.

The reset state and the set state may be set to data of "1" and "0," respectively, and the data may be sensed by measuring the resistivity of the phase change element 210 in the memory cell 200. Alternatively, the reset state and the set state may be set to data of "0" and "1," respectively.

Therefore, the data stored in the memory cell 200 can be read by applying a read pulse READ to the memory cell 200. The read pulse READ is applied with a low current during a very short time tREAD such that the state of the memory cell 200 is not changed. The current of the read pulse READ may be lower than the current of the set pulse SET, and the applied time of the read pulse READ may be shorter than the applied time tRST of the reset pulse RESET. Because the resistivity of the phase change element 210 in the memory cell 200 is different according to the state of the phase change element 210, the state of the phase change element 210, i.e., the data stored in the memory cell 200, can be read by a magnitude of a current flowing to the phase change element 210 or a voltage drop on the phase change element 210.

In one embodiment, the state of the memory cell 200 may be read by a voltage at the memory cell 200 when the read pulse READ is applied. In this case, since the phase change element 210 of the memory cell 200 has a relatively high resistance in the reset state, the state may be determined to the reset state in a case that the voltage sensed at the phase change element 210 is relatively high and to the set state in a case that the voltage sensed at the phase change element 210 is relatively low. In another embodiment, the state of the memory cell 200 may be read by an output current when a voltage is applied to the memory cell 200. In this case, the state may be determined to the reset state in a case that the current sensed at the phase change element 210 is relatively low and to the set state in a case that the current sensed at the phase change element 210 is relatively high.

As writing data is practically a sequence of reset and set processes in the PRAM, a write operation is much slower than a read operation by the reset pulse having the longer applied time.

Figure 5:
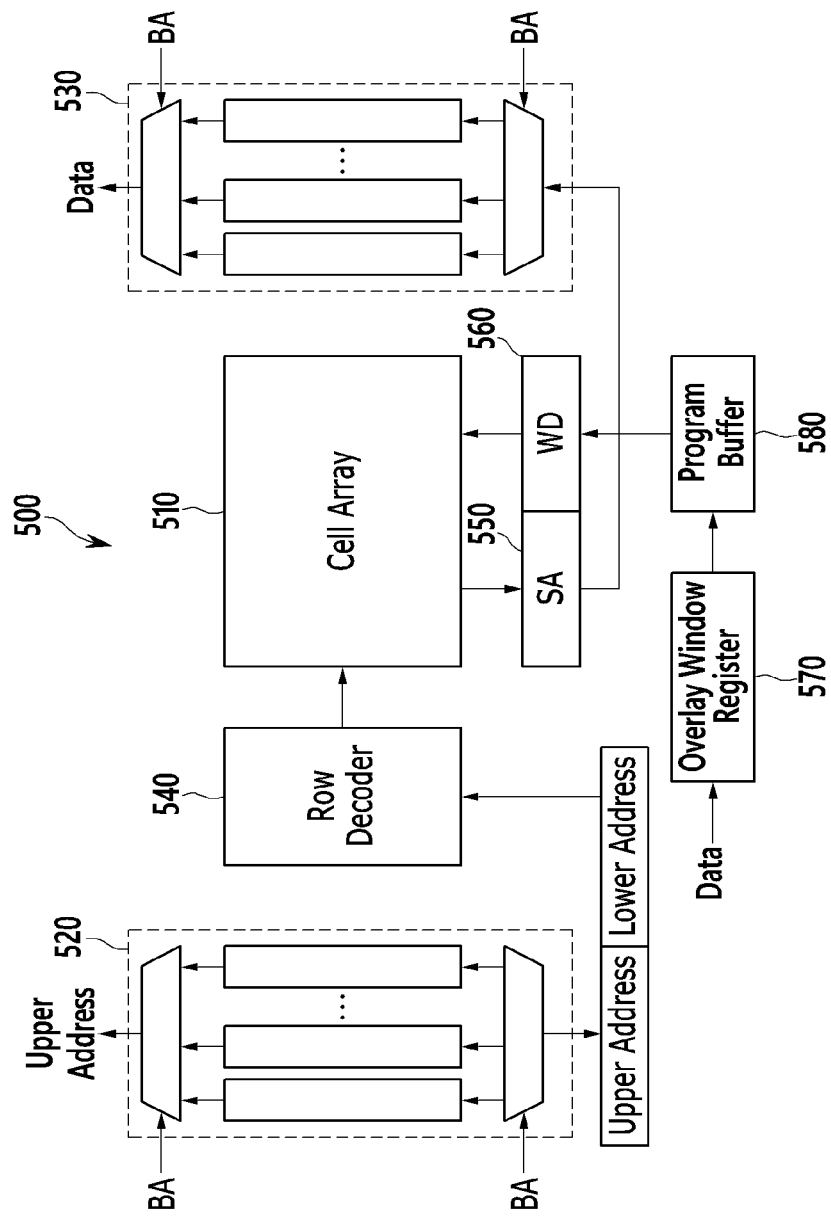
FIG. 5 is a schematic block diagram of a PRAM module in a PRAM-based coprocessor according to an embodiment of the present invention.

FIG. 5 is a schematic block diagram of a PRAM module in a PRAM-based coprocessor according to an embodiment of the present invention. A PRAM module shown in FIG. 5 may be a PRAM chip or a PRAM bank.

Referring to FIG. 5, a PRAM module 500 includes a memory cell array 510, a row address buffer 520, a row data buffer 530, a row decoder 540, a sense amplifier 550, and a write driver 560.

The memory cell array 510 includes a plurality of word lines (not shown) extending substantially in a row direction, a plurality of bit lines (not shown) extending substantially in a column direction, and a plurality of memory cells (not shown) that are connected to the word lines and the bit lines and are formed in a substantially matrix format. The memory cell may be, for example, a memory cell 200 described with reference to FIG. 2.

Both the row address buffer 520 and the row data buffer 530 form a row buffer. In some embodiments, to address an asynchronous latency issue that the write operation is slower than the read operation, a plurality of row buffers, i.e., a plurality of row address buffers 520 and a plurality of row data buffers 530 may be provided.

The row address buffer 520 stores commands and addresses (particularly, row addresses) from a memory controller (not shown). In some embodiments, the plurality of row address buffers 520 may be provided. In one embodiment, a row address buffer 520 may be provided for each bank, and the memory controller may provide a bank address (for example, a buffer number) for addressing the row address buffer 520. In another embodiment, two or more row address buffers 422 may be provided for each bank, and each row address buffer 422 may be addressed by a bank address or a part of the bank address.

The row data buffer 530 stores data from the memory cell array 510. In some embodiments, the plurality of row data buffers 530 may be provided. In one embodiment, a row data buffer 530 may be provided for each bank, and the memory controller may provide a bank address (for example, a buffer number) for addressing the row data buffer 530. In another embodiment, two or more row data buffers 530 may be provided for each bank, and each row data buffer 530 may be addressed by a bank address or a part of the bank address.

In some embodiments, the PRAM module 500 may employ a non-volatile memory (NVM) interface to use the plurality of row buffers 520 and 530. In one embodiment, the non-volatile memory interface may be a double data rate (DDR) interface, for example, LPDDR2-NVM (low-power double data rate 2 non-volatile memory) interface. In this case, the row address buffer 520 receives a row address and a bank address via the NVM interface, and the row data buffer 530 outputs data via the NVM interface.

The row decoder 540 decodes a row address to select a target row from among the plurality of rows in the memory cell array 510. That is, the row decoder 540 selects a target word line for reading data or writing data from among the plurality of word lines of the memory cell array 510.

In some embodiments, the row address transferred from the memory controller may be divided into an upper address and a lower address. In this case, the upper address may be delivered to the row address buffer 520, and the lower address may be directly delivered to the row decoder 540. The row decoder 540 may combine the upper address accommodated in the row address buffer 520 with the directly delivered lower address to select the target row.

The sense amplifier 550 reads data stored in the memory cell array 510. The sense amplifier 550 may read the data, through a plurality of bit lines, from a plurality of memory cells connected to the word line selected by the row decoder 540. The write driver 560 writes the input data to the memory cell array 510. The write driver 560 may write the data, through a plurality of bit lines, to a plurality of memory cells connected to the word line selected by the row decoder 540.

In some embodiments, to address the issue that the write operation is slower than the read operation, the PRAM module 500 may first store the input data to a buffer and then write the stored data to the memory cell array 510. For this, the PRAM module 500 may use an overlay window 570 and 580 that is a region (memory-mapped region) mapped to the memory cell array 510. The overlay window may include overlay window registers 570 and a program buffer 580. The overlay window registers 570 may be memory-mapped registers, and the program buffer 580 may be accessed through the overlay window registers 570. In one embodiment, information on write data (for example, the first data address and the number of bytes to be programmed) may be written to the registers 570 and then the write data may be stored to the program buffer 580. Next, when a predetermined value is written to the overlay window registers 570, the data stored to the program buffer 580 may be written to the memory cell array 510. In this case, the memory controller may determine whether the write operation is completed by polling the overlay window registers 570.

Figure 6:
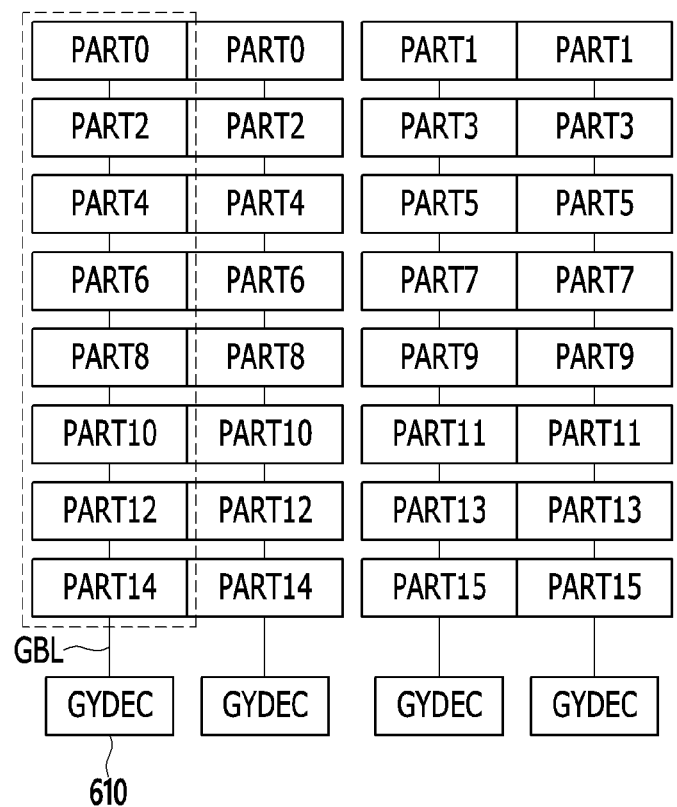
FIG. 6 shows an example of a partitioning scheme in a memory cell array of a PRAM module according to an embodiment of the present invention.
Figure 7:
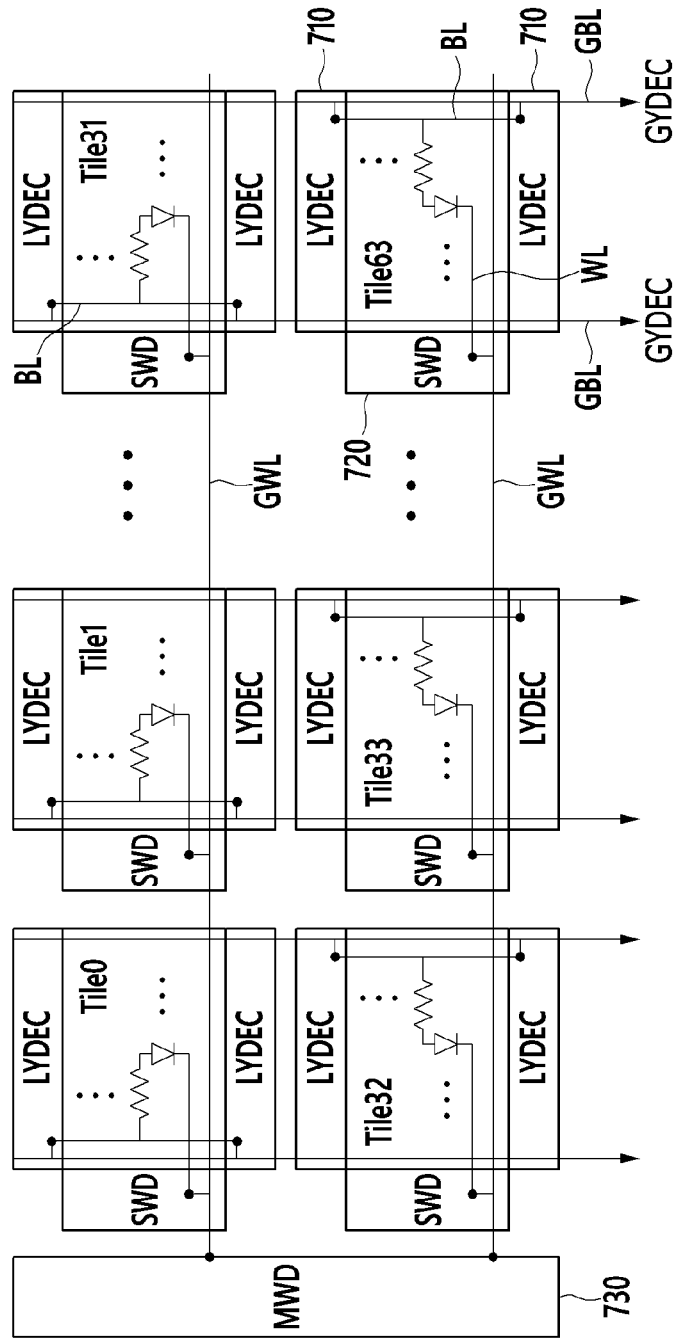
FIG. 7 schematically shows a half-partition in a PRAM module according to an embodiment of the present invention.

FIG. 6 shows an example of a partitioning scheme in a memory cell array of a PRAM module according to an embodiment of the present invention, and FIG. 7 schematically shows a half-partition in a PRAM module according to an embodiment of the present invention.

Referring to FIG. 6, in some embodiments, a memory cell array 510 may be partitioned into a plurality of partitions PART0 to PART15. It is shown in FIG. 6 that the memory cell array 510 is partitioned into sixteen partitions PART0 to PART15 by being divided into two parts in a row direction and into eight parts in a column direction. A plurality of row buffers 520 and 530 may be connected to the partitions PART0 to PART15. Each partition may be split into two parts (called half-partitions) to reduce parasitic resistances of bit lines and word lines. For example, each partition may be split into two half-partitions in the row direction.

In some embodiments, the partitions PART0 to PART15 may be split into a group of even-numbered partitions PART0, PART2, PART4, PART6, PART8, PART10, PART12, and PART14 arranged into the column direction and a group of odd-numbered partitions PART1, PART3, PART5, PART7, PART8, PART11, and PART13 arranged in the column direction. Then, eight half-partitions arranged in the column direction may form a half-partition group and four half-partition groups may be disposed. In this case, the PRAM module 500 may further include a plurality of global column decoders (hereinafter referred to as "GYDECs") 610 that correspond to the half-partition groups, respectively. Each GYDEC 610 is connected to a plurality of global bit lines GBL formed in a corresponding half-partition group.

Referring to FIG. 7, in some embodiments, each half-partition may include a plurality of sub-arrays which are referred to as tiles. It is shown in FIG. 7 that one half-partition includes 64 tiles Tile0 to Tile63.

Each tile includes a plurality of memory cells connected to a plurality of bit lines BL and a plurality of word lines WL. For convenience, one memory cell among the plurality of memory cells, and one bit line BL and one word line WL connected to the one memory cell are shown in FIG. 7. Further, a phase change element and a switching element forming the memory cell are shown as a resister and a diode, respectively.

A local column decoder (hereinafter referred to as an "LYDEC") 710 may be connected to each tile. The LYDEC 710 is connected to the plurality of bit lines BL of a corresponding tile. In some embodiments, two LYDECs 710 may be connected to both ends of the corresponding tile, respectively. Further, the plurality of global bit lines GBL formed in the half-partition group correspond to the plurality of tiles, respectively, and each global bit line GBL is connected to the plurality of bit lines BL of the corresponding tile. In some embodiments, the LYDEC 710 together with the GYDEC 610 may be used to select bit lines BL in the corresponding tile of the corresponding half-partition. A sense amplifier (550 of FIG. 5) may read data through the selected bit lines BL or a write driver (560 of FIG. 5) may write data through the selected bit lines BL.

A sub-word line driver (hereinafter referred to as an "SWD") 720 may be connected to each tile to maximize the degree of parallelism. A global word line GWL may be formed in the half-partition and may be connected to a main word line driver (hereinafter referred to as an "MWD") 730. In this case, a plurality of word lines WL formed in the half-partition may be connected to the global word line GWL. In some embodiments, as shown in FIG. 7, two global word lines GWL connected to the MWD 730 may be formed in the half-partition. This scheme is called a dual word line scheme. In this case, the plurality of tiles included in the half-partition may be grouped into two tile groups, and the two global word lines GWL may correspond to the two tile groups, respectively. All the SWDs within the half-partition are connected to a main word line driver (MWD). In addition, the two tiles may be grouped into a block by the dual word line scheme. In some embodiments, the SWD 720 together with the MWD 730 may be used to drive a word line WL in the corresponding tile. The driven word line WL may be selected by a row decoder (540 of FIG. 5).

When the PRAM module 500 uses the partitions shown in FIG. 6 and FIG. 7, the PRAM module 500 can simultaneously perform 64 I/O operations per half-partition. Since the four half-partitions can be accessed in parallel in the partitions shown in FIG. 6 and FIG. 7, the PRAM module 500 can simultaneously manipulate 256-bit data. For this, a plurality of sense amplifies 550 and a plurality of write drivers 560 may be provided to the half-partition group.

Next, a PRAM-based coprocessor according to an embodiment of the present invention is described with reference FIG. 8A to FIG. 13.

Figure 8A:
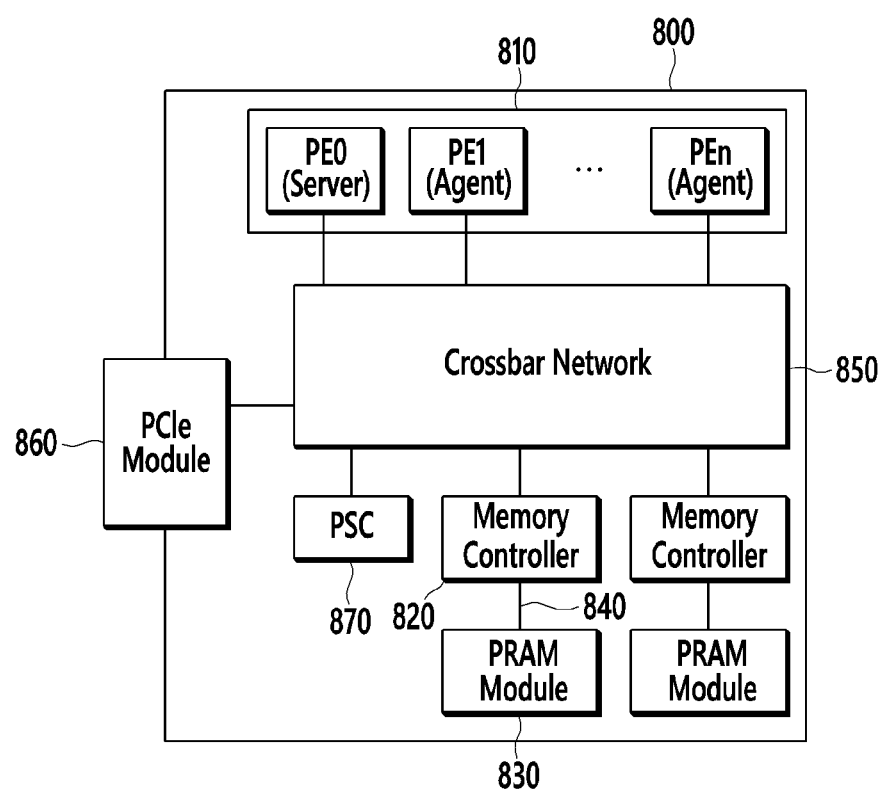
FIG. 8A is a schematic block diagram showing a PRAM-based coprocessor according to an embodiment of the present invention.
Figure 8B:
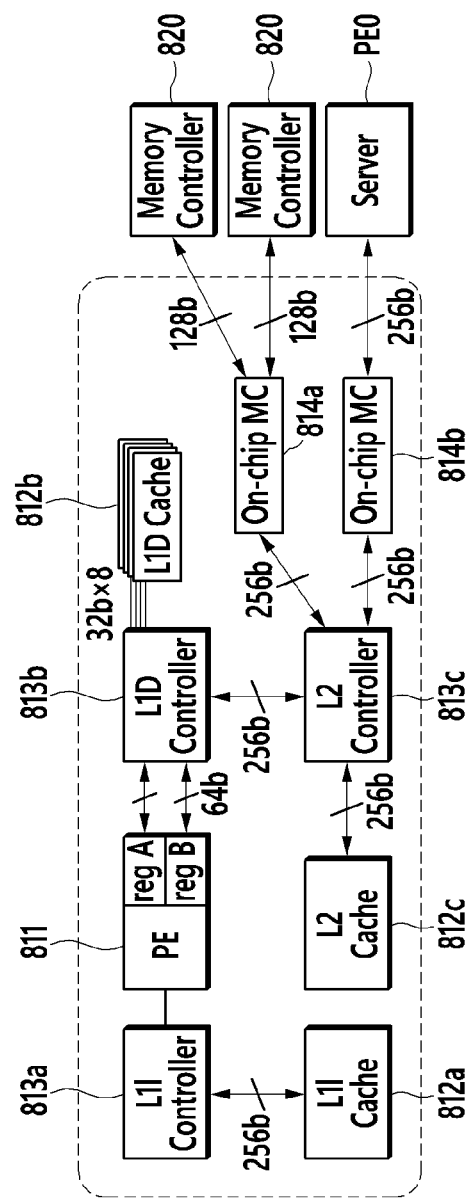
FIG. 8B is a schematic block diagram showing an agent in a PRAM-based coprocessor according to an embodiment of the present invention.

FIG. 8A is a schematic block diagram showing a PRAM-based coprocessor according to an embodiment of the present invention, and FIG. 8B is a schematic block diagram showing an agent in a PRAM-based coprocessor according to an embodiment of the present invention.

Referring to FIG. 8A, a PRAM-based coprocessor 800 includes a coprocessor 810, a memory controller 820, and a PRAM module 830.

The coprocessor 810 includes a plurality of processing elements PE0 to PEn. Each processing element corresponds to a coprocessor core and includes a cache. In some embodiments, the cache may include an L1 cache (level 1 cache) and an L2 cache (level 2 cache).

The processing elements PE0 to PEn may be classified into a server PE0 and agents PE1 to PEn according to their roles. Most processing elements PE1 to PEn of the coprocessor 810 are allocated to handle kernels provided by the host. These processing elements PE1 to PEn are referred to as agents. One or a few processing elements PE0 of the coprocessor 810 are allocated to schedule kernel executions on the agents and are referred to as servers. The server PE0 may manage memory traffics requested by the agents PE1 to PEn.

In some embodiments, since the server PE0 manages the memory requests generated by the agents PE1 to PEn, the server PE0 may be implemented by a controller instead of the processing element used as the core.

In some embodiments, the server PE0 may include a memory controller unit (MCU) that takes over a cache miss of the agent and administrates the associated PRAM accesses by collaborating with the memory controller 820.

In some embodiments, as shown in FIG. 8B, the agent may include a processing element 811, a cache 812a, 812b, and 812c, a cache controller 813a, 813b, and 813c, and an on-chip memory controller 814a and 814b.

In one embodiment, the cache may include an L1 instruction (LH) cache 812a, an L1 data (L1D) cache 812b, and an L2 cache 812c. In this case, the cache controller may include an L1I cache controller 813a, an L1D cache controller 813b, and an L2 cache controller 813c which are connected to the L1I cache 812a, the L1D cache 812b, and the L2 cache 812c, respectively. Each of the cache controllers 813a, 813b, and 813c may determine whether a request is a cache hit or miss in a corresponding one of the caches 812a, 812b, and 812c. The L1I cache 812a and the L1D cache 812b may be connected to the processing element 811 via the L1I cache controller 813a and the L1D cache controller 813b, respectively, and the L2 cache 812c may be connected to the processing element 811 via the L2 cache controller 813c connected to the L1D cache controller 813b. For example, the L1I cache controller 813a may be connected to the L1I cache 812a via a 128-bit bus, the L1D cache controller 813b may be connected to the L2 cache controller 813c via a 128-bit bus, and the L2 cache controller 813c may be connected to the L2 cache 812c via a 128-bit bus. The L1D cache controller 813b may be connected to two registers regA and regB of the processing element 811 via 64-bit buses, respectively, and may be connected to the L1D cache 812b via eight 32-bit buses in parallel.

In one embodiment, the on-chip memory controller may be connected to the cache controller, in particular, the L2 cache controller 813c. The on-chip memory controller may include two on-chip memory controllers 814a and 814b which are connected to the server PE0 and the memory controller 820, respectively. For example, the on-chip memory controller 814a may be connected to the L2 cache controller 813c via a 256-bit bus and connected to the server PE0 via a 256-bit bus. The on-chip memory controller 814b may be connected to the L2 cache controller 813c via a 256-bit bus and connected to the two memory controllers 820 via 128-bit buses, respectively.

In one embodiment, the L2 cache controller 813c may generate a memory request through the on-chip memory controllers 814a and 814b when the cache miss occurs in the L2 cache 812c. The memory request may be transferred to the server PE0 via the on-chip memory controller 814a. Data which the memory controller 820 reads from the PRAM module 830 in accordance with the memory request may be stored to the L2 cache 812c via the on-chip memory controller 814b and the L2 cache controller 813c.

While it is shown in FIG. 8A that one of the processing elements PE0 to PEn is allocated to the server and remaining processing elements PE1 to PEn are allocated to the agents, two or more processing elements may be allocated to the servers.

The memory controller 820 is connected to the PRAM module 830 via a channel (which may be called a bus) 840. The memory controller 820 receives a memory request from the server and transfers the memory request to the PRAM module 830 through the channel 840. The memory controller 820 transfers memory read/write commands and addresses to and exchanges data with the PRAM module 830 through the channel 840.

In some embodiments, the PRAM module 830 may employ an NVM interface. In one embodiment, the NVM interface may be a DDR interface, for example, a LPDDR2-NVM interface. In a case that the PRAM module 830 employs the DDR interface, the channel 840 may be a DDR channel, for example, an LPDDR channel In some embodiments, a plurality of PRAM modules 830 may be commonly connected to one channel 840. In one embodiment, a plurality of PRAM banks, for example, sixteen PRAM banks may be commonly connected to one channel 840.

In some embodiments, a plurality of memory controllers 820 may be provided. It is shown in FIG. 8A and FIG. 8B that two memory controllers 820 are provided. In this case, the plurality of memory controllers 820 are connected to different channels 840, respectively.

The PRAM-based coprocessor 800 may further include a network 850 for connecting the processing elements PE0 to PEn with the memory controller 820 to integrate the processing elements PE0 to PEn, the memory controller 820, and the PRAM module 830. In some embodiments, the network 850 may be a crossbar network for p:q communications (p and q are integers more than one).

In some embodiments, the PRAM-based coprocessor 800 may further include an interface module 860 that is used for communicating with the host. The interface module 860 may be, for example, a PCIe module for a PCIe interface. The host can communicate with the coprocessor 810, particularly, the server PE0 of the coprocessor 810 and the memory controller 820 through the interface module 860. For the communication, the interface module 860 is also connected to the network 850.

In some embodiments, the PRAM-based coprocessor may further include a power sleep controller (PSC) 870. The PSC 870 may control a mode of each of the agents PE1 to PEn in accordance with a control of the server PE0. The server PE0 may put each of the agents PE1 to PEn in a sleep mode (which may be called an idle mode) or revoke each of the agents PE1 to PEn, using the PSC 870. Accordingly, the server PE0 can suspend or resume the kernel execution in each of the agents PE1 to PEn using the PSC 870.

In some embodiments, each of the processing elements PE0 to PEn may be connected to the network via a master port and a slave port, and the memory controller 820 may be connected to the network via a master port and a slave port. In one embodiment, the interface module 860 may be connected to the network 850 via a master port and a slave port such that the host can communicate with the server PE0 and the memory controller 820. The PSC 870 may be connected to the network 850 via a master port and a slave port.

According to the above embodiments, the server PE0 can take over cache misses of the agent via the network 850 and then administrate associated PRAM accesses by collaborating with the memory controller 820. The server PE0 may send a memory read or write message to the memory controller 820 through a bus, and then, the memory controller 820 may manage transactions upon the PRAM module 830.

In some embodiment, in a case that the PRAM module 830 employs the DDR interface, for example the LPDDR2-NVM interface, the memory controller 820 may convert requests of the server PE0 to LPDDR2-NVM transactions. For this, the memory controller 820 may perform three-phase addressing.

A memory address, i.e., a row address to be transferred from the memory controller 820 to the PRAM module 830 may be divided into an upper address and a lower address. For example, when the row address uses (n+1) bits, the upper address may use upper (n−m+1) bits (a[n:m]) and the lower address may use lower (m−x) bits (a[m−1:x]) (n, m, and x are integers more than zero).

Figure 9:
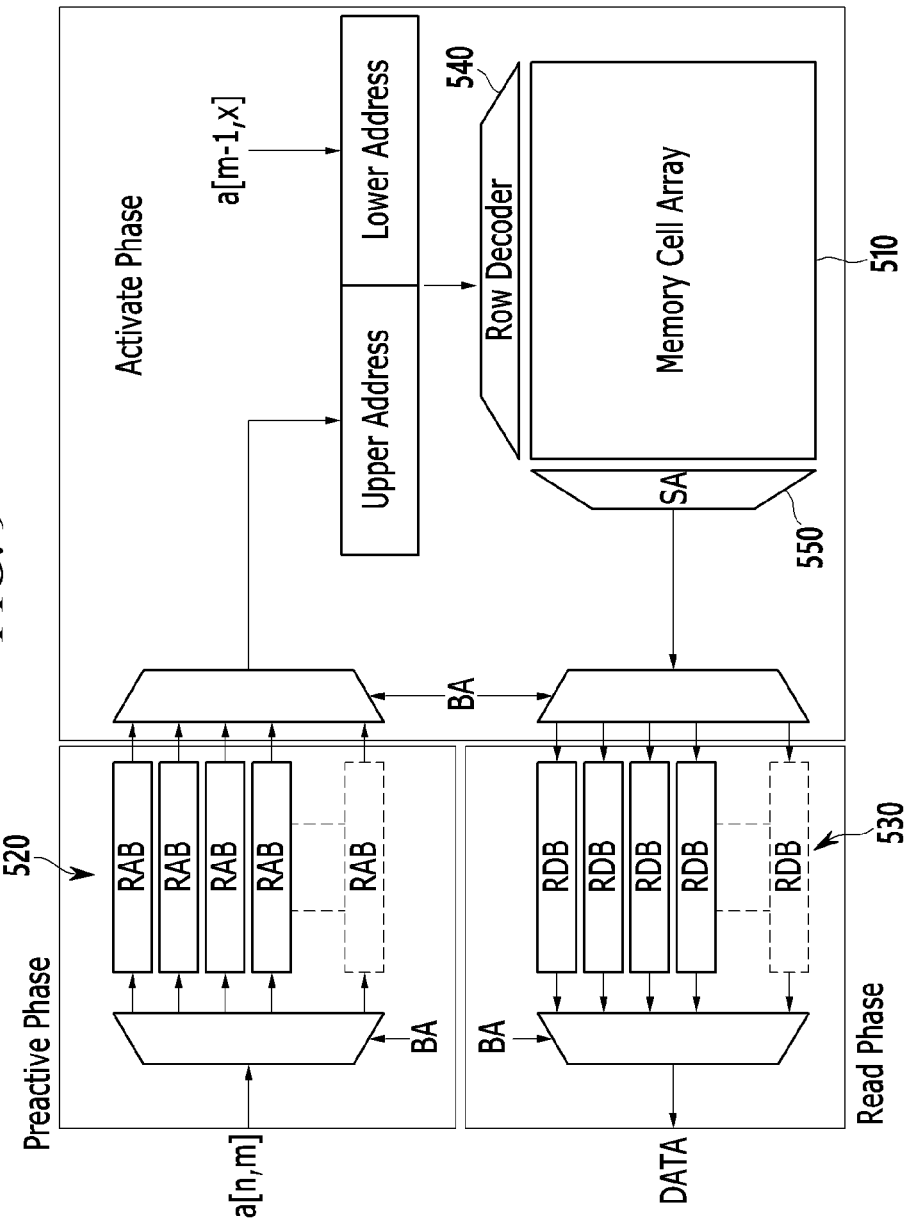
FIG. 9 shows three-phase addressing in a PRAM-based coprocessor according to an embodiment of the present invention.

FIG. 9 shows three-phase addressing in a PRAM-based coprocessor according to an embodiment of the present invention.

Referring to FIG. 9, in a preactive phase that is the first phase in the three-phase addressing, the memory controller (820 of FIG. 8A) stores an upper address (a[n,m]) of a row address in a target row address buffer (RAB) 520. When a plurality of RABs 520 are provided, the target RAB 520 may be selected by a buffer address BA indicating a buffer number.

In an active phase that is the second phase, the memory controller 820 directly delivers a remaining part of the row address, i.e., a lower address (a[m−1,x]) to the PRAM module 830. The lower address (a[m−1,x]) delivered to the PRAM module 830 is combined with the upper address (a[n,m]) stored in the RAB 520 to be delivered to a target row decoder (540 of FIG. 5). The RAB 520 storing the upper address (a[n,m]) may be selected by the buffer address BA.

Accordingly, the row decoder selects a target row in a memory cell array using the combined address. For a read operation, a sense amplifier 550 may transfer data from the target row to a target row data buffer (RDB) 530. The target RDB 530 may be selected by a buffer address BA.

In a read phase that is the last phase, the memory controller 820 selects the target RDB 530 using the buffer address BA and selects a start address of read data using a column address. Accordingly, the memory controller 820 can read and output the read data stored in the RDB 530.

As such, the memory controller 820 delivers the row address to the PRAM module 830 by dividing the row address into the upper address and the lower address such that the PRAM-based coprocessor can be implemented using the DDR interface, particularly, the LPDDR2-NVM interface.

In some embodiments, if the upper address of the target row already exists in the RABs 520, the memory controller 820 may skip the preactive phase and directly enable the active phase. In some embodiments, if data of the target row are ready on the RDBs 530, the memory controller 830 may skip the active phase.

In a write operation, the row decoder 540 may deliver the combined address of the upper address and the lower address to overlay window registers (570 of FIG. 5). Then, write data can be stored in a program buffer (580 of FIG. 5) through the overlay window registers 570. Accordingly, a server PE0 or a host can recognize that the write data are written to the PRAM module 830 such that the issue that the write operation is slower than the read operation can be solved. Further, since the data stored in the program buffer 580 are programmed to the memory cell array 510, the memory controller 820 can determine whether the write operation to the memory cell array is actually completed by polling the overlay window registers 570.

As such, since the PRAM-based coprocessor performs the write operation using the overlay window 570 and 580, the issue that the write operation is slower than the read operation in the PRAM module can be solved.

Alternatively, in some embodiments, the write data may be stored in the target RDB 530 and then be programmed from the target RDB 530 to the memory cell array 510.

Figure 10:
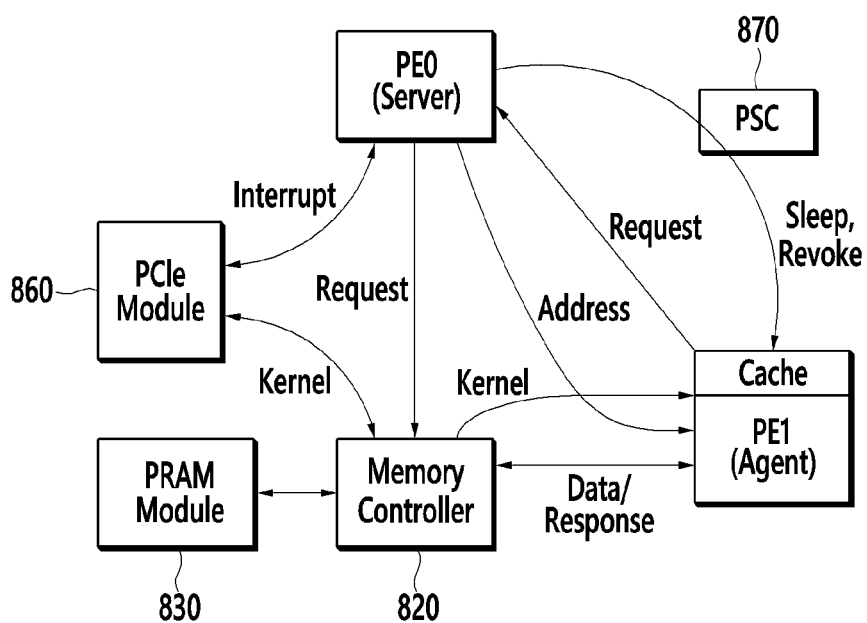
FIG. 10 shows operations of a PRAM-based coprocessor according to an embodiment of the present invention.
Figure 11:
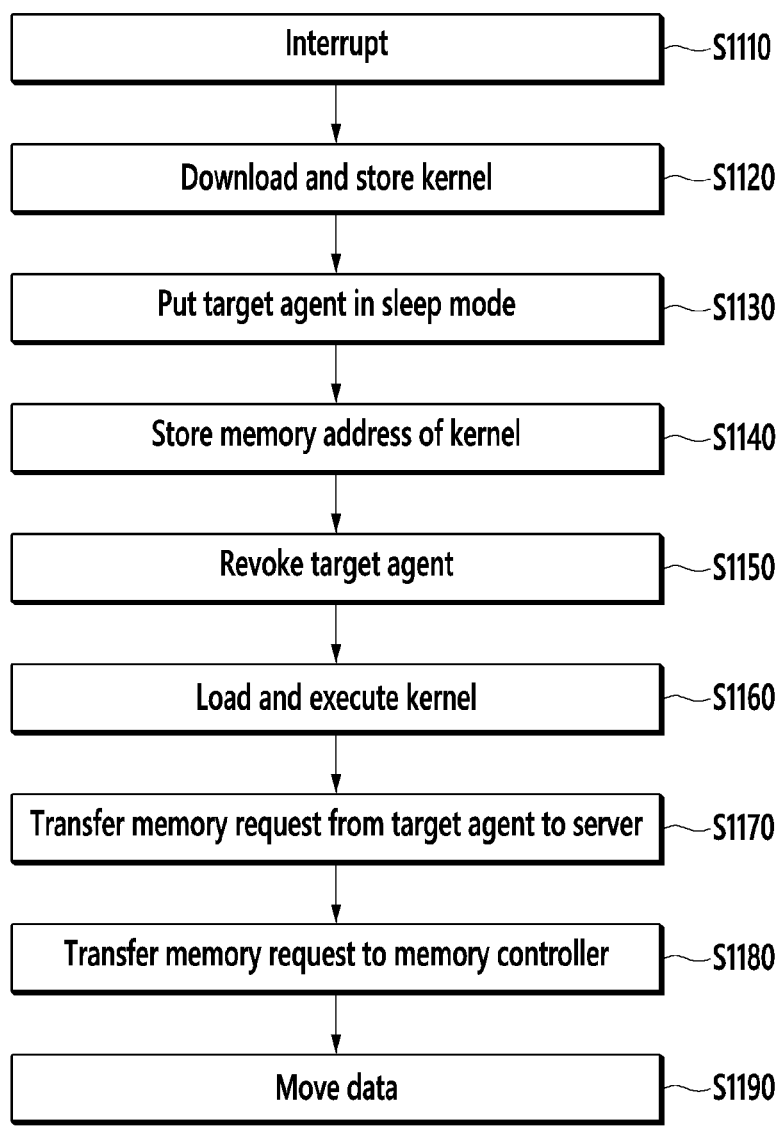
FIG. 11 is a flowchart showing data movement method of a PRAM-based coprocessor according to an embodiment of the present invention.

FIG. 10 shows operations of a PRAM-based coprocessor according to an embodiment of the present invention, and FIG. 11 is a flowchart showing data movement method of a PRAM-based coprocessor according to an embodiment of the present invention.

Referring to FIG. 10 and FIG. 11, a host issues an interrupt, for example, a PCIe interrupt to a PRAM-based coprocessor. Accordingly, the interrupt from the host is forwarded from an interface module 860 to a server PE0 within the PRAM-based coprocessor (S1110). Then, the memory controller 820 downloads data including a kernel through the interface module 860 from a host-side memory and stores the data to a PRAM module 830 (S1120). In some embodiments, the data may be downloaded into a designated image space of the PRAM module 830.

Once the download has been performed, the server PE0 stores a memory address (i.e., an address of the PRAM module 830 to which the kernel is stored) of the kernel to a cache of a target agent PE1 among a plurality of agents as a boot address (S1140). In some embodiments, the cache for storing the memory address may be an L2 cache. In some embodiments, before storing the memory address of the kernel, the server PE0 may put the target agent PE1 in a sleep mode using a PSC 870 (S1130).

Once the memory address of the kernel is stored, the target agent PE1 loads the kernel from the PRAM module 830 based on the memory address stored in the cache and executes the kernel (S1160) since the memory address is stored in the cache as the boot address. In some embodiments, the server PE0 may revoke the target agent PE1 of the sleep mode via the PSC 870 (S1150). Then, as the target agent PE1 awakes, it loads the kernel from the PRAM module 830 based on the memory address stored in the cache and executes the kernel (S1160).

During the kernel execution, if data requested by the agent PE1 hits the cache, for example, the L2 cache, the agent PE1 can use the data stored in the cache. However, in case of a cache miss, the agent PE1 issues a memory request generated by the cache miss to the server PE0 (S1170). Then, the server PE0 transfers the memory request to the memory controller 820 of the PRAM module 830 (S1180). In some embodiments, the memory controller 820 may transfer a row address for accessing the PRAM module 830 to the PRAM module 830 by dividing the row address into an upper address and a lower address, in accordance with the memory request. The memory controller 820 sends a response with data corresponding to the memory request to the agent PE1 (S1190). The memory controller 820 may move data from a target row of a memory cell array (510 of FIG. 5), which is selected by a row address buffer (520 of FIG. 5) of the PRAM module 830, to a row data buffer (530 of FIG. 5) in accordance with the memory request and transfer the data moved to the row data buffer 530 to the agent PE1. In this case, if the data are ready on the row data buffer 530, the memory controller 820 may skip moving the data from the memory cell array 510 to the row data buffer 520. For example, the memory controller 820 may upload the data, which are read from the PRAM module 830, to the L2 cache of the agent PE1. As such, the PRAM-based coprocessor can store the data to the L2 cache of the agent PE1 using the row buffer 520 and 530 of the PRAM module 830, without an assistance of a main memory (120 of FIG. 1) or other memories of the computing device.

Further, the agent PE1 may issue a memory request for requesting to write data to the PRAM module 830 to the server PE0 (S1170). Then, the server PE0 may transfer the memory request to the memory controller 820 of the PRAM module 830 (S1180), and the memory controller 820 may write data corresponding to the memory request from the agent PE1 to the PRAM module 830 and send a response to the agent PE1 (S1190). That is, the memory controller 820 may determine a target row address using the row address buffer 520 and store the write data of the agent PE1 to a program buffer (590 of FIG. 5) of the PRAM module 830 in accordance with the memory request, and write the data stored in the program buffer 590 to the target row of the memory cell array 510. For example, the memory controller 820 may fetch the data from the L2 cache of the agent and write the data to the PRAM module 830. As such, the PRAM-based coprocessor can load the data from the L2 cache of the agent PE1 and write the data to the PRAM module 830 using the row buffer 520 of the PRAM module 830, without an assistance of the main memory 120 or other memories of the computing device.

Accordingly, the server PE0 can transfer data between the agent PE1 and the row data buffer 530 or program buffer 590 of the PRAM module 830 through the memory controller 820. As such, each processing element can directly access a storage core within the PRAM-based coprocessor, i.e., the PRAM module 830, through conventional load/store instructions. That is, the PRAM module accesses can be done without any modification of the existing instruction set architecture and without an assistance of an operation system (OS) of the computing device. Therefore, data movements between the host's storage device and the coprocessor can be removed.

Figure 12:
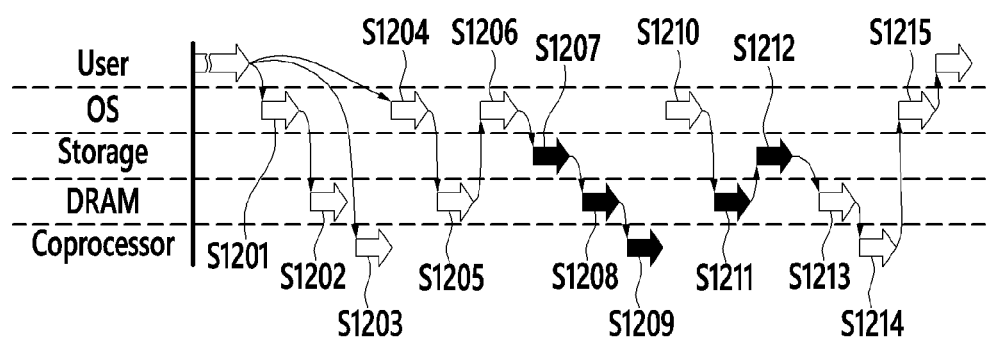
FIG. 12 shows data movements on a coprocessor of a conventional computing device.
Figure 13:
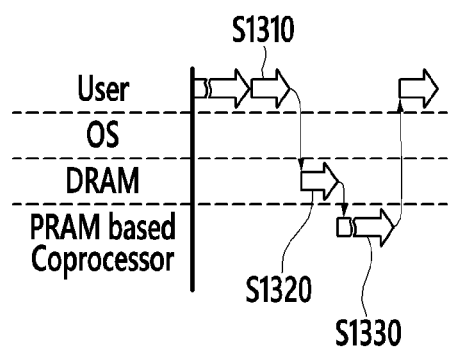
FIG. 13 shows data movements on a PRAM-based coprocessor of a computing device according to an embodiment of the present invention.

FIG. 12 shows data movements on a coprocessor of a conventional computing device, and FIG. 13 shows data movements on a PRAM-based coprocessor of a computing device according to an embodiment of the present invention.

Referring to FIG. 12, an application creates a file descriptor for a read and/or a write through an OS in response to a user's application execution (S1201). Then, a virtual memory is allocated to a system memory, for example, a DRAM for reading data from a storage device or writing data to the storage device (S1202). Further, a coprocessor's memory is allocated for writing data to the coprocessor or reading data from the coprocessor (S1203).

The application then requests a file read for the storage device through the OS (S1204), and a physical memory is allocated to the DRAM (S1205). File data are requested for the storage device through the OS (S1206). Then, the file data are transferred from the storage device to the physical memory of the DRAM and are copied from the physical memory of the DRAM to the virtual memory (S1207). The application then transfers the file data from the DRAM to the coprocessor's memory (S1208). Consequently, the coprocessor processes the file data. Next, result data of the file data are transferred from the coprocessor's memory to the virtual memory of the DRAM (S1209).

The application then requests a file write for the storage device (S1210). A physical memory is allocated to the DRAM such that the result data are copied from the virtual memory to the physical memory of the DRAM (S1211) and are transferred from the DRAM to the storage device (S1212).

Next, the application releases the virtual memory of the DRAM allocated for the read and/or write (S1213), and releases the coprocessor's memory allocated for the write and/or read (S1214). Further, the application deletes the file descriptor created for the read and/or write (S1215).

In FIG. 12, the steps S1201 to S1206, S1210, S1213, S1214, and S1215 represent system operations, and the steps S1207, S1208, S1209, S1211, and S1212 represent data movements.

As described above, the conventional computing device is required to create the file descriptor and allocate multiple memory spaces which reside in the host-side memory (DRAM) and in the coprocessor's memory. Then, inputs/outputs for the storage device and the data movements between the host-side memory and the coprocessor's memory can be performed. In this case, the CPU is frequently required to intervene in data transfers between multiple user software and kernel modules, which are involved in both the coprocessor and storage stacks. These interventions introduce user/kernel mode switching and redundant data copies, which waste a large number of cycles in moving the data between the storage device and the coprocessor. However, from the viewpoint of the user, the CPU does not need to access the input (or output) data at all, which is mostly used in the target coprocessor.

In contrast, according to an embodiment of the present invention, as shown in FIG. 13, a kernel is generated by the user and is stored in a system memory (S1310). The kernel is transferred from the system memory to a PRAM-based coprocessor (S1320), and tasks of the kernel are executed and completed within the PRAM-based coprocessor (S1330).

As such, the PRAM-based coprocessor according to an embodiment of the present invention unifies computational resources and storage resources, and therefore, the user can compose a kernel on the host and simply transfer the kernel to the target coprocessor for execution. Accordingly, unnecessary host-side software interventions and memory copies among the CPU, the storage device, and the coprocessor can be eliminated.

FIG. 14 shows a programming model on a PRAM-based coprocessor according to an embodiment of the present invention.

Referring to FIG. 14, a user may use, for example, a pushData( ) function and a writeMemory( ) function to load a kernel. The pushData( ) function may define a host-side memory address where the kernel exists, and the writeMemory( ) function may define a target address on the PRAM-based coprocessor, i.e., an address of a PRAM module, to which the kernel is to be stored. Accordingly, information (kernel) indicating the kernel to be downloaded from the host and the host-side memory address (&boot_addr) where the kernel exists may be, as parameters, input to the pushData( ) function like pushData(kernel, &boot_addr). Further, an address (MAGIC_ADDR) of the PRAM module to which the kernel is to be stored and the host-side memory address (&boot_addr) where the kernel exists may be, as parameters, input to the writeMemory( ) function like writeMemory(MAGIC_ADDR, &boot_addr).

Once the data processing is completed in the PRAM-based coprocessor, if necessary, the user may use, for example, a SaveOutputFile( ) function to retrieve data from the PRAM-based coprocessor. The SaveOutputFile( ) function may specify a storage address and a memory buffer. Accordingly, the storage address (FPGA_ADDR) to which the data are stored in the PRAM-based coprocessor and the memory buffer (memBuffer) to which the retrieved data are to be stored may be, as parameters, input to the SaveOutputFile( ) function like SaveOutputFile(FPGA_ADDR, memBuffer).

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A coprocessor performing data processing by supplementing functions of a central processing unit (CPU) of a host or independently of the CPU, the coprocessor comprising:
   a plurality of processing elements that correspond to a core of the coprocessor, wherein when a first processing element among the plurality of processing elements executes a kernel stored in a resistance switching memory module storing the unexecuted kernel from the host, a second processing element among the processing elements exclusively manages a memory request generated according to an execution of the kernel by the first processing element;
   a memory controller that is connected to the resistance switching memory module and makes the first processing element access the resistance switching memory module, thereby moving data corresponding to the memory request between the resistance switching memory module and the first processing element in accordance with the memory request transferred from the second processing element; and a network that integrates the plurality of processing elements and the memory controller.

2. The coprocessor of claim 1, wherein the data are not stored in the host while the data are moved.

3. The coprocessor of claim 1, wherein the second processing element stores a memory address of the kernel stored in the resistance switching memory module to the first processing element, for the execution of the kernel.

4. The coprocessor of claim 3, wherein the second processing element stores the memory address of the kernel to a cache of the first processing element as a boot address.

5. The coprocessor of claim 4, further comprising a power sleep controller that controls a sleep mode of the first processing element in accordance with a control of the second processing element, wherein the second processing element puts the first processing element in the sleep mode using the power sleep controller before storing the memory address of the kernel to the first processing element, and revokes the first processing element using the power sleep controller after storing the memory address of the kernel to the first processing element.

6. The coprocessor of claim 3, further comprising an interface module that is used for a communication with the host, wherein after the second processing element receives an interrupt from the host through the interface module, the memory controller stores the kernel from the host to the resistance switching memory module.

7. The coprocessor of claim 1, wherein the first processing element includes a cache, wherein the first processing element issues the memory request to the second processing element when a cache miss occurs in the cache of the first processing element, and wherein the memory controller reads data corresponding to the memory request from the resistance switching memory module and stores the data to the cache of the first processing element, without an assistance of other memories of the computing device.

8. The coprocessor of claim 1, wherein the first processing element includes a cache, wherein the memory request includes a memory request for requesting to write data, and wherein the memory controller loads data corresponding to the memory request from the cache of the first processing element and writes the data to the resistance switching memory module, without an assistance of other memories of the computing device.

9. The coprocessor of claim 1, wherein the resistance switching memory module employs a DOR (double data rate) interface.

10. The coprocessor of claim 9, wherein the DOR interface is a nonvolatile memory interface.

11. The coprocessor of claim 1, wherein the resistance switching memory module comprises:
a memory cell array including a plurality of resistance switching memory cells;
a plurality of row address buffers; and
a row decoder that selects a target row from the memory cell array,
wherein the memory controller divides a row address for accessing the resistance switching memory module in accordance with the memory request into an upper address and a lower address, delivers the upper address to a target row address buffer among the plurality of row address buffers, and delivers the lower address to the row decoder, and wherein the row decoder selects the target row based on an address into which the upper address stored in the target row address buffer and the lower address received from the memory controller are combined.

12. The coprocessor of claim 11, wherein the memory controller transfers an address for selecting the target row address buffer from among the plurality of row address buffers to the plurality of row address buffers.

13. The coprocessor of claim 11, wherein the resistance switching memory module further comprises a plurality of row data buffers, wherein data that are read from the target row of the memory cell array are stored to a target row data buffer among the plurality of row data buffers.

14. The coprocessor of claim 11, wherein the resistance switching memory module further comprises:
a register mapped to the memory cell array; and
a program buffer that stores data to be written to the memory cell array based on a value of the register,
wherein the data stored in the program buffer are written to the memory cell array.

15. The coprocessor of claim 1, wherein the resistance switching memory module includes a phase-change memory module, a resistive memory module, or a magnetoresistive memory module.

16. A computing device comprising:
a coprocessor according to claim 1;
a CPU;
a system memory; and
a memory bridge that connects the coprocessor and the system memory with the CPU.

17. A coprocessor performing data processing by supplementing functions of a central processing unit (CPU) of a host or independently of the CPU, the coprocessor comprising:
an interface module that is used for a communication with the host;
a resistance switching memory module that stores an unexecuted kernel transferred from the host;
a plurality of processing elements that correspond to a core of the coprocessor, wherein when a first processing element among the plurality of processing elements loads the kernel from the resistance switching memory module to execute the kernel, a second processing element among the plurality of processing elements exclusively communicates and receives from the first processing element a memory request generated according to an execution of the kernel;
a memory controller that is connected to the resistance switching memory module and makes the first processing element access the resistance switching memory module in response to receiving the memory request transferred from the second processing element; and
a network that integrates the interface module, the plurality of processing elements, and the memory controller.

18. The coprocessor of claim 17, wherein the memory controller accesses the resistance switching memory module in accordance with the memory request to move the data between the resistance switching memory module and the first processing element without an assistance of an operating system and other memories of a computing device.

19. The coprocessor of claim 18, wherein the data are not stored in the host while the data are moved.

20. The coprocessor of claim 17, wherein the second processing element stores a memory address of the kernel stored in the resistance switching memory module to the first processing element, and wherein the first processing element loads the kernel based on the memory address.

21. The coprocessor of claim 20, further comprising a power sleep controller that controls a sleep mode of the first processing element in accordance with a control of the second processing element, wherein the second processing element puts the first processing element in the sleep mode using the power sleep controller before storing the memory address of the kernel to the first processing element, and revokes the first processing element using the power sleep controller after storing the memory address of the kernel to the first processing element.

* * * * *